J. E. BRANDENBERGER.
COMPOSITE CELLULOSE FILM.
APPLICATION FILED MAY 26, 1914.
1,266,766.
Patented May 21, 1918.
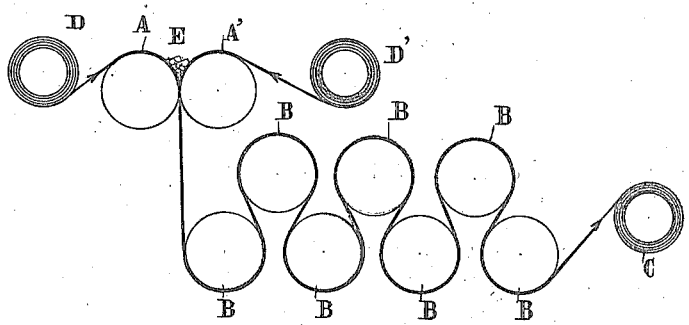
WITNESSES
Edward R. Whitman
E. G. McGee
INVENTOR
Jacques Edwin Brandenberger
BY
Emil Bouwelycke
ATTORNEY

UNITED STATES PATENT OFFICE.

JACQUES EDWIN BRANDENBERGER, OF THAON-LES-VOSGES, FRANCE, ASSIGNOR TO SOCIÉTÉ DITE: LA CELLOPHANE, OF PARIS, FRANCE.

COMPOSITE CELLULOSE FILM.

1,266,766.  Specification of Letters Patent.  Patented May 21, 1918.

Application filed May 26, 1914. Serial No. 841,150.

*To all whom it may concern:*

Be it known that I, JACQUES EDWIN BRANDENBERGER, a citizen of the Swiss Confederation, and resident of Thaon-les-Vosges, France, have invented a new and useful Composite Cellulose Film, which is fully set forth in the following specification.

It is known to be impossible to continuously manufacture by machinery certain films obtained from viscous materials, more particularly gelatin films. On the other hand, continuous manufacture of cellulose films by means of aqueous solution of nitrocellulose, offers great difficulties, if it is attempted to obtain thick or rigid films.

The process according to this invention, consists in producing in a continuous manner a film, the thickness of which can vary within fairly wide limits, by inclosing between two nitro-cellulose films a plastic material such as gelatin, resin, oil, paraffin, rubber, etc.

The accompanying drawing shows a diagrammatic view of a form of machine which enables the new product to be obtained in a continuous manner.

This machine chiefly consists of two cylinders A and A' which can be heated by steam or in any other way, and the distance between the said cylinders is adjustable.

The two continuous nitro-cellulose films between which the plastic material must be inclosed, are wound on two cylinders D and D' and fed over and between the cylinders A and A' between which films at the point where they enter the nip of the cylinders A, A', is introduced the liquid or pasty plastic material E which is to be inclosed. The compound film comprising the two nitro-cellulose films and the plastic material is then brought to the series of cylinders B which may be heated. The number of cylinders and the temperature of heating are regulated by the conditions of solidification of the inclosed plastic material.

These cylinders B can either be heated inside or inclosed within a hot chamber. They must be sufficiently near one another to enable the compound film to readily traverse all of the cylinders, and to pass from the last cylinder in a state of complete solidification without any tearing, to the winding cylinder C. The thickness of the continuous film to be obtained, depends on the distance between the cylinders A and A'. According to the nature of the cellulose films employed, and to that of the plastic material inclosed, products are obtained, which may vary greatly in appearance from one another; that is to say, they may be colored or uncolored, transparent or opaque, plain or ribbed, printed or unprinted.

One of the two films could be even glued to a backing or supporting sheet or strip of paper, fabric, thin metal etc. It is even possible to introduce into the plastic material solid substances in the form of powder, fibers, blades, etc., so as to obtain special results.

In certain cases where it is desired to attain a special result which could not be obtained with two nitro-cellulose films, it has been found that the mechanical process hereinbefore described is suitable for superposing two films, only one of which is in the nature of nitro-cellulose, with the insertion of a third substance between them.

It is merely important to select for the second film one which is capable of being unwound in a continuous manner, and through which the plastic material cannot penetrate. By way of example, this second film could be a sheet of thin metal, paper or fabric.

In the special cases where it may be considered necessary, it will be possible, with the process hereinbefore described, to introduce between the two films to be superposed, one or more continuous or non-continuous strips of material, for instance fabrics, at the same time as the plastic material in which they would be embedded.

Claims:

1. A continuous, film-like body of indefinite length, which comprises continuous, outer and inner, solid nitro-cellulose films, and a continuous layer of plastic material intermediate of, and solidified between, said nitro-cellulose films; one of said nitro-cellulose films having a continuous backing strip pasted thereto.

2. A continuous, film-like body which comprises a plastic substance solidified between two continuous, solid films of cellulose, said plastic substance having small particles of solid material incorporated therein.

In testimony whereof I have signed this specification in the presence of two subscribing witnesses.

JACQUES EDWIN BRANDENBERGER.

Witnesses:
EMILE LEDRET,
CHAS. P. PRESSLY.